United States Patent Office 3,395,340
Patented July 30, 1968

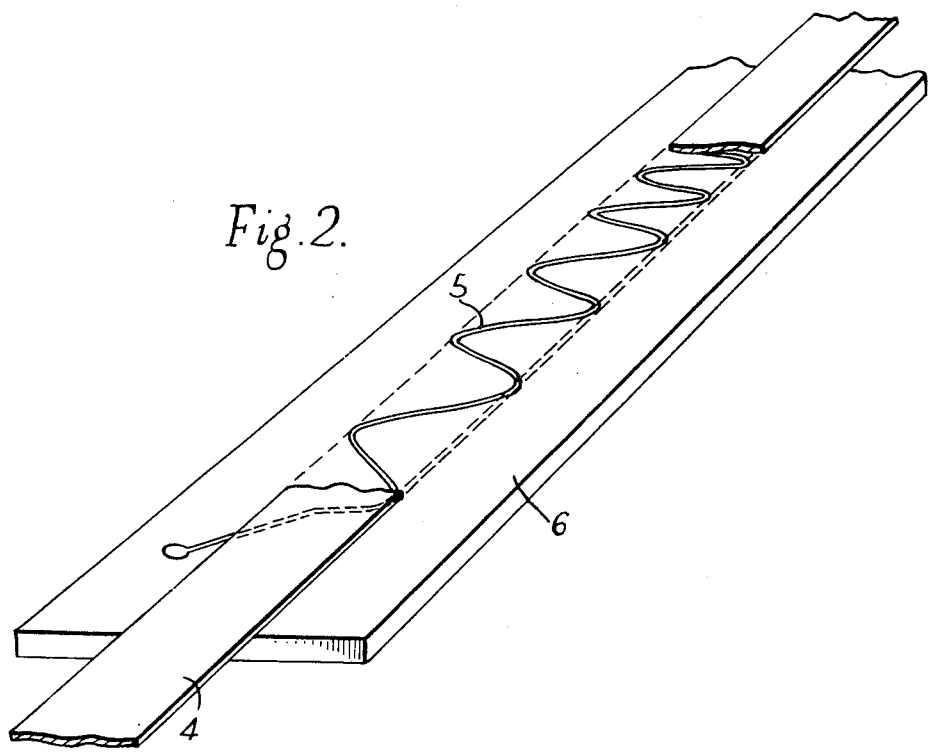

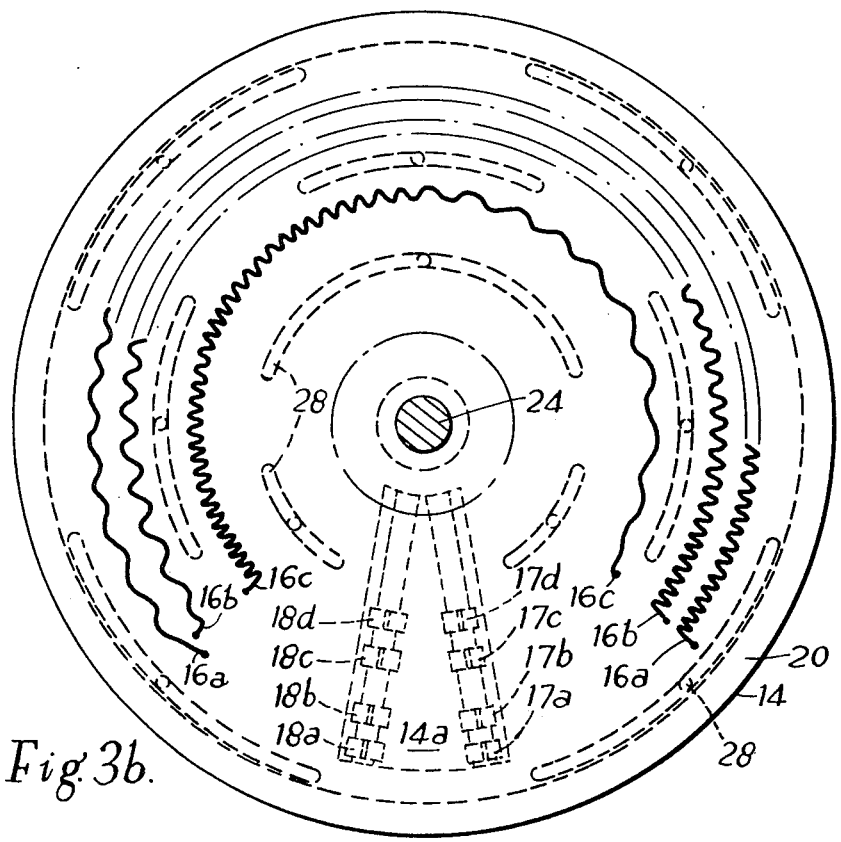
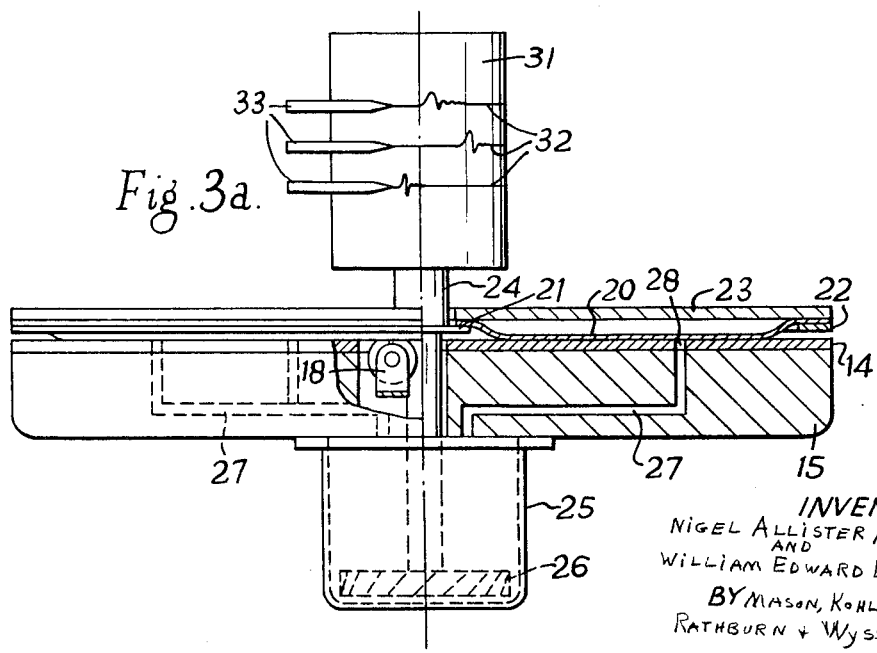

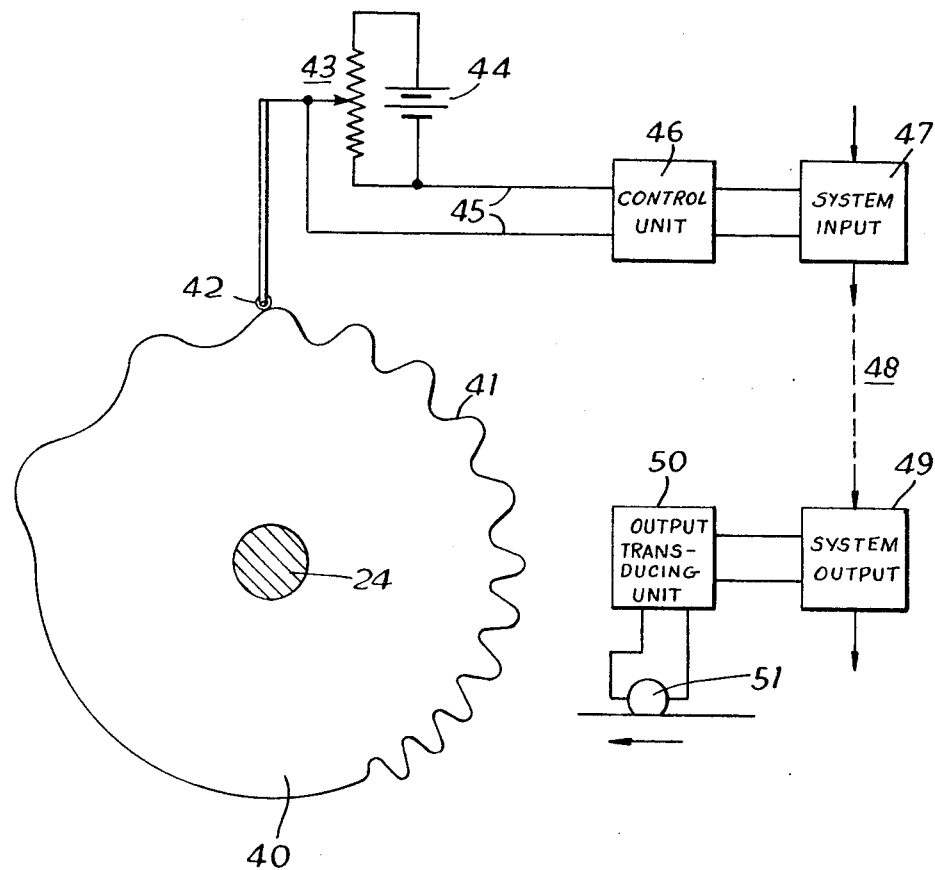

3,395,340
METHOD AND APPARATUS FOR DETERMINING CHARACTERISTICS OF A SIGNAL TRANSFER SYSTEM
Nigel Allister Anstey, Orpington, and William E. Lerwill, Keston, England, assignors to Seismograph Service Corporation, Tulsa, Okla.
Continuation of application Ser. No. 243,448, Dec. 10, 1962. This application Sept. 12, 1966, Ser. No. 584,639
12 Claims. (Cl. 324—57)

ABSTRACT OF THE DISCLOSURE

A method and apparatus for determining phase-frequency or amplitude-frequency characteristics of a signal handling system. A test signal passed through the system produces an output which is correlated with a second signal to develop a correlation output. The correlation output is compared with a further signal to obtain the desired system characteristic.

---

This invention relates generally to methods of and apparatus for use in the determination of system transfer characteristics. This application is a continuation of U.S. application Ser. No. 243,448, filed Dec. 10, 1962 by the inventors of the present application.

The invention is applicable to the determination of a system transfer characteristic or characteristics in any system along which a function passes and in which said function may be affected by a transfer characteristic of the system. The invention is thus suitable for a wide range of uses and applications. These include, for example, the testing of acoustical and similar systems, in which the amplitude and/or phase of components of an electrical or other signal are affected by the transfer characteristics of the system, and also the testing or working of industrial or other systems, examples of which latter include process control systems in chemical works (for example in oil refineries) and in machine systems (for example in machine tool programming).

For the sake of convenience the term "system transfer characteristics" will be used, wherever the context permits, to cover a characteristic of any system along which a function passes, which function may be in an electrical form (for example a wave form) or in a physical or material form (for example as temperature, pressure or rate of flow) and which may be affected during its passage by a characteristic of the system.

It may be noted also that by the term "correlation" as used herein there is meant an assessment of the similarity or relationship between two quantities.

The term "cross-correlation" refers to a specific form of correlation which includes the steps, firstly, of imposing a delay on one function, secondly, multiplying the other function by the delayed function and, thirdly, integrating the product over a finite time.

By auto-correlation is meant the cross-correlation of two identical patterns.

It is one of the objects of the present invention to provide a novel or improved method of and apparatus for use in the determination of system transfer characteristics while a more particular object is the provision of such methods and apparatus which utilize cross-correlation.

A further object of the invention is to provide such a method and apparatus which includes means for generating a test signal, preferably one having a linear sweep and for feeding this signal or a function thereof into the system to be tested and means for cross-correlating an output from the system with the input signal.

One method of determining transfer characteristics involves the plotting of separate amplitude-frequency and phase-frequency diagrams. This method is appropriate when the signals normally handled by the system are of sinusoidal type, or when the design criteria are best expressed in terms of sine waves. The disadvantages of the method are that it is often slow, and that the action of the system on transient signals is difficult to visualize.

A second method of determining transfer characteristics involves the display of the time-response of the system to a unit impulse. This impulse-response method is appropriate when the signals handled by the system are largely of transient type, when there are many paths between input and output, or when a quick assessment of the effect of a change in the system is required. The impulse response and the combination of the amplitude-frequency and phase-frequency responses incorporate the same information, but display this information in quite different forms; the Fourier transform is necessary to pass from one to the other.

A third method of determining transfer characteristics involves the use of a test signal of arbitrary waveform and suitable bandwidth, and the cross-correlation of the system output signal with this input test signal. This method is based on the Wiener-Lee relation:

$$\phi_{gr}\tau = \int_{-\infty}^{\infty} h(t) \cdot \phi_{gg}(\tau - t) dt$$

where $h(t)$ is the system impulse-response, $\phi_{gg}(\tau)$ is the auto-correlation of the input signal, and $\phi_{gr}(\tau)$ is the cross-correlation of input and output. When the bandwidth of the input signal exceeds the width of the pass-band of the system under test, then the cross-correlation of input and output will approximate to the impulse-response.

Of the input signals which are suitable for use in a correlative method of determining transfer characteristics, three are of particular importance.

The first such signal is a constant-amplitude quasi-sinusoid signal whose frequency is swept between limits as a linear function of time. It is well known that such a signal (herein termed a "linear-frequency sweep") has an amplitude spectrum which is substantially rectangular, provided that the product of signal bandwidth and signal duration is large.

The second form of signal which is suitable is one which is effectively-white Gaussian noise (i.e., noise whose amplitude distribution is random and whose power spectrum is flat over a band wider than the pass-band of the system under test).

The third suitable form of signal is one derived from a group of random or pseudo-random binary signals. The amplitude of these signals is always either +1 or −1, but the zero-crossings follows one random or pseudo-random distribution. Such signals may be made by extreme clipping of effectively-white Gaussian noise, or by various random-choice methods akin to tossing a coin, or (in the case of the pseudo-random signals) by a statistical design procedure.

Each of the above three test signals has particular virtues. The binary signals have the advantage of simplifying the correlating apparatus, under certain circumstances. The pseudo-random signals have particular advantage where the excitation repeats periodically. The effectively-white Gaussian noise signals have the advantage that, in many systems, the perturbing effect of the system's own noise may be used as the input signal.

Nevertheless, much of the following material is presented in terms of the linear-frequency sweep. This is because the apparatus of the present invention, when used with a linear-frequency sweep, allows simultaneous display of the amplitude-frequency relation, the phase frequency relation and the impulse-response; thus it provides simultaneously a number of desirable features which do not all appear together in other testing methods.

Correlation methods of response-testing have the additional feature and advantage that they can operate in the presence of other signals passing through the system under test. These other signals may be considerably greater in amplitude than the test signal, without disturbing the measurement, provided that the time-bandwidth product for the test signal is large. Thus it is possible to determine the impulse-response of a system which is handling its normal throughput; the system need not be separated from its normal function, and the test signal may be so small that its presence does not significantly affect the condition of any servo loops incorporated in the system. Once the impulse response has been obtained, a Fourier transform operation may be performed on that part of it which is at significant amplitude.

Further objects, features and advantages of the present invention will become apparent from a study of the following description, taken in conjunction with the accompanying drawings.

In the drawings:

FIGURE 2 is a detail view showing diagrammatically one method of effecting cross-correlation which may be used in carrying out the invention;

FIGURE 3a is a vertical sectional view showing, partly diagrammatically and in section, one form of apparatus which may be used in carrying out the invention;

FIGURE 3b is a plan view showing the lower part of the apparatus of FIGURE 3a;

FIGURE 4 shows diagrammatically one method of carrying out the invention;

Figure 1:
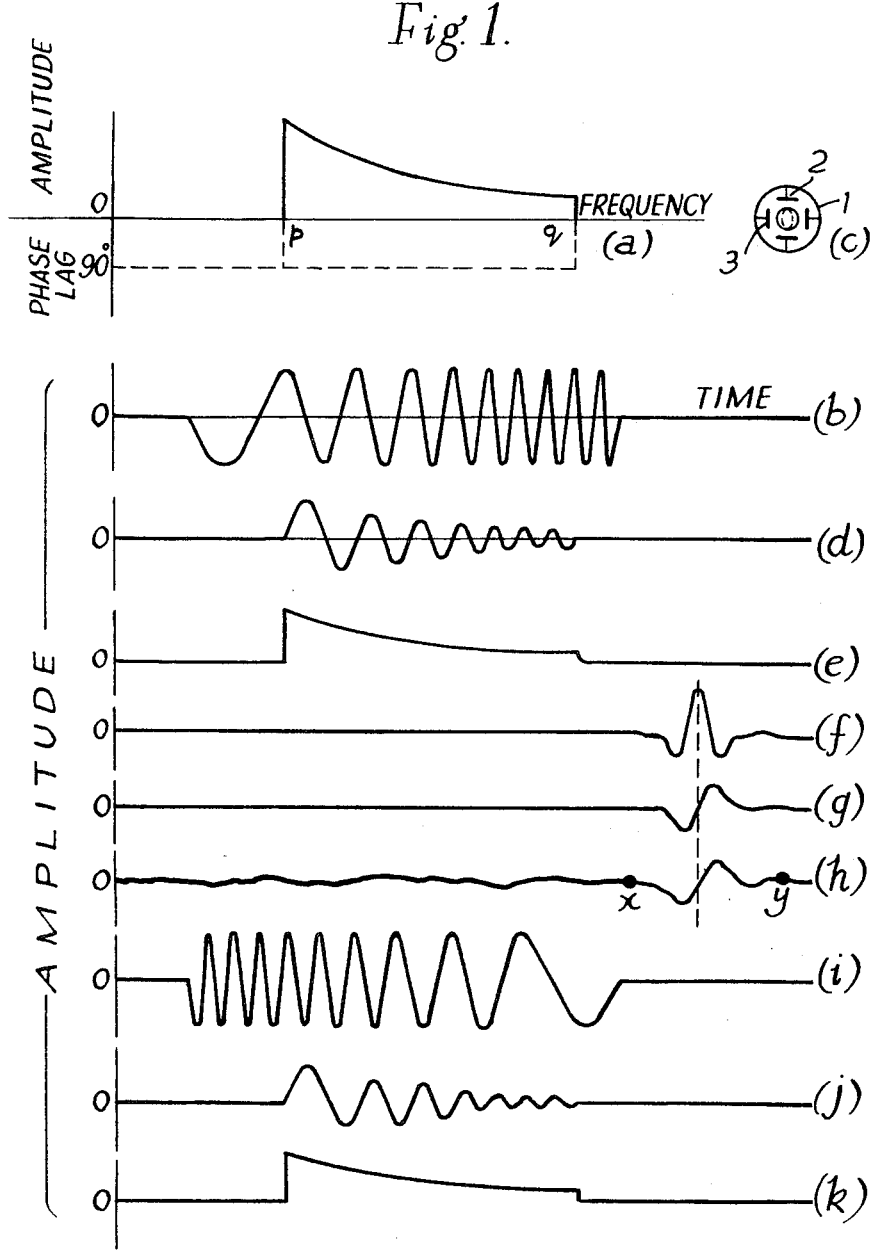
FIGURE 1 illustrates diagrammatically the general principles on which the invention is based and methods of carrying it out, FIGURES 1a and 1b and FIGURES 1d to 1k representing characteristics of the system and apparatus and of the signals used and FIGURE 1c illustrating purely diagrammatically one method of comparing input and output signals.

Referring first to FIGURE 1 and more particularly to FIGURE 1a, this shows the amplitude-frequency and phase-frequency responses of a system which is assumed to be under test using a method and apparatus representative of the present invention. For simplicity the response of an integrating network superimposed on an ideal rectangular band-pass filter has been selected, FIGURE 1a showing the amplitude-frequency response in a broken line. With this arrangement the amplitude-frequency response has a slope of 6 db/octave between the limit frequencies $p$ and $q$, while the phase-frequency response has a constant phase lag of 90°.

The linear-frequency sweep which is to be employed as the test signal is illustrated in FIGURE 1b. The X-axis of FIGURE 1a is frequency, while that of FIGURE 1b is time; the linear relation between the two allows the juxtaposition of the figures, as shown.

When the sweep of FIGURE 1b is passed through an acoustical or other system having the transfer characteristics of FIGURE 1a, the result is as shown in FIGURE 1d (provided that the time-bandwidth product of the sweep is large, and certainly much larger than these illustrative diagrams indicate). The rectification and smoothing of this output results in the waveform of FIGURE 1e, which represents the desired frequency-amplitude relation. This is well known, and constitutes the basis for what is known in the art as "wobbulated" measurements. If the phase relation between the input and output signals is monitored (for example, by a Lissajous display or by the use of a phase-sensitive rectifier circuit) the phase-frequency relation may also be explored. This is symbolized in FIGURE 1c, which represents a cathode ray tube 1 having vertical and horizontal deflecting plates 2 and 3 to which the input signal (FIGURE 1b) and output signal (FIGURE 1d), respectively, are applied.

If now the input to the system (as represented by FIGURE 1b) is auto-correlated, the result is as shown in FIGURE 1f. If the output of the system (as represented by FIGURE 1d) is cross-correlated against the input (FIGURE 1b), the result is as shown in FIGURE 1g; this is, very nearly, the impulse-response of the system.

Thus, for the case where the test sweep represents the only input to the system, the combination of a sweep signal and a cross-correlator provides both the frequency-response information and the impulse-response information.

When the test sweep is only a small part of the input to the system, however, the information represented by FIGURE 1d will be submerged in the normal output and will not be discernible. The cross-correlator output, on the other hand, will appear as shown in FIGURE 1h; in this output the impulse-response is still clearly discernible. The amplitude of the impulse-response, relative to that associated with the normal output after correlation, is increased by a factor approaching the square root of the time-bandwidth product of the test signal.

If the waveform of FIGURE 1h is gated, so that the waveform is zero everywhere except between the points $x$ and $y$ (containing all significant parts of the impulse response), and the resulting gated waveform is cross-correlated with the original sweep (which, depending on the physical realization, may require to be reversed in time as shown in FIGURE 1i) the result is the waveform of FIGURE 1j. Provided that the time-bandwidth product of the original sweep is adequate, this waveform of FIGURE 1j is very similar to that of FIGURE 1d. The amplitude response of the system can then be derived by rectification and smoothing, as is shown in FIGURE 1k. The phase response can be obtained, in the manner indicated by FIGURE 1c, by phase-comparison of the waveform of FIGURE 1j with a suitably-delayed version of that of FIGURE 1b.

The methods of and apparatus for determining system transfer characteristics in accordance with the present invention, which will be more fully described hereinafter, possess a number of features and advantages. Thus, when the test signal is the only input to the system under test, the apparatus can be arranged to:

(i) Generate a linear sweep as the test signal;

(ii) Provide facility for displaying the system output as an amplitude-frequency and/or a phase-frequency plot, and (iii) Cross-correlate the system output against the input, thereby providing a close approximation to the impulse-response.

When the test signal must be a small part of the total input to the system, the apparatus can be arranged to:

(i) Generate a suitable wide-band signal (which may be a linear sweep) as the test signal;

(ii) Cross-correlate the system output against the input to provide a waveform which represents a close approximation to the impulse-response, superposed on a residue of correlation background;

(iii) Provide facility for gating out those parts of the waveform which do not include a major contribution from the impulse-response;

(iv) Cross-correlate this gated waveform against a suitable linear sweep, which may be a time-inverted version of the test signal, and (v) Display the result of this second correlation as an amplitude-frequency and/or phase-frequency plot.

The present applicants have filed several other patent applications which are relevant.

United States application Ser. No. 190,912 describes a general method of correlation which involves the expression of one variable to be correlated as a pattern of energy variations in space and the expression of the other variable as a pattern of sensitivity variations of an extended detector sensitive to the said energy variations. This general method may be applied in any frequency range.

United States application Ser. No. 192,669 describes a cross-correlator apparatus based on this general method and adapted to the frequency range of from a few cycles per second to a few hundred cycles per second. In this apparatus the first variable is recorded conventionally on a magnetic tape moving at fairly low speed (for example 3.75 inches per second) while the second variable is represented by a conducting trace of the waveform (conveniently made by the printed-circuit technique) in which the pattern of magnetic variations in the moving tape induces a voltage representing the second derivative of the cross-correlation function.

FIGURE 2 of the accompanying drawings illustrates such an arrangement. In it 4 represents the moving magnetic tape and 5 represents the conducting trace, which is supported on an insulating board 6.

Applicants' copending U.S. application Ser. No. 249,336 filed Jan. 4, 1963 and assigned to the same assignee as the present application describes apparatus for extending the frequency response of such a device down to a few cycles per hour, by recording the data at a slow speed and by correlating it at a higher speed.

Applicants' copending application Ser. No. 235,622, filed Nov. 6, 1962 and assigned to the same assignee as the present invention describes apparatus for implementing magnetic correlation at audio frequencies; this employs a fast-moving magnetic medium in the form of a sheet or disc. The frequency range of such apparatus may also be extended by recording at one speed and by correlating at another.

The above patent applications, taken together, describe methods of and means for performing the operation of cross-correlation from the lowest frequencies normally encountered in industry up to high radio frequencies. The present invention provides for the determination of system transfer characteristics over a correspondingly wide range of frequencies. Details of the following material, while they may be described with reference to a particular frequency range, have counterparts in many other frequency ranges. The embodiments to be described are, therefore, to be considered as illustrative only of many of the features and applications of the present invention.

Referring first to FIGURES 3a and 3b of the accompanying drawings, these show a device which may be used for determining system transfer characteristics in accordance with the present invention but which is similar in a number of respects to apparatus described in the aforesaid application Ser. No. 235,622.

In FIGURES 3a and 3b the numeral 14 represents a circular board of insulating material which takes the place of the board 6 of FIGURE 2. This board 14, which is mounted on a cast, moulded or other suitable base 15, carries a number of conducting tracks 16, more specifically the tracks 16a, 16b and 16c, which are analogous to the conducting trace 5 of FIGURE 2. These tracks 16 are conveniently made by a printed-circuit process similar to that which is described in said application Ser. No. 235,622. A cut-away hole 14a in the board 14 allows record-playback heads 17 and erase heads 18 to be mounted with their gaps flush with the plane of the conducting waveforms 16. Four record-playback heads 17a, 17b, 17c and 17d with corresponding erase heads 18a, 18b, 18c and 18d are shown.

A disc 20 formed of an oxide-coated plastic sheet is made to revolve above the board 14 with its active face in contact with the conducting waveforms 16 and with the heads 17 and 18. This disc 20 is secured at its center and edge by means of suitable clamping means, indicated at 21 and 22 respectively, to a circular driving member 23, which is mounted on and driven by a shaft 24 using a synchronous electric motor 25. A gear-box (not shown) having several selectable speed reduction ratios may be inserted between the motor 25 and the shaft 24.

The underneath oxide face of the disc 20 may be maintained in contact with the heads 17 and 18 and with the conducting waveforms 16 by gravity, by an increased air pressure above the disc or by a partial vacuum below it. In the latter case a fan 26 (which may be one fitted in the motor 25 to draw cooling air between its stator and rotor) may be used to reduce the air pressure in channels 27 (which extend through the base 15 and board 14, where they terminate in openings 28). The resulting suction tends to hold the disc 20 in contact with the heads 17 and 18 and with the board 14 as it rotates.

For the present application of this correlating device, a minimum of four record-playback heads 17a, 17b, 17c and 17d, is desirable, with the corresponding erase heads 18a, 18b, 18c and 18d. The three printed-circuit tracks 16a, 16b and 16c are arranged to be concentric with the heads 17a, 17b and 17c, respectively. The track 16b represents a linear-frequency sweep which (if the disc 20 rotates anticlockwise in FIGURE 3b) sweeps from high to low frequency. Track 16c represents the same sweep between the same end-frequencies, but reversed in time (so that it sweeps from low to high frequencies). With a disc diameter of 12 inches, and using printed tracks 16 of width ¼ inch, it has been found possible to achieve sweeps having bandwidths of several octaves and time-bandwidth products of several hundred.

The track 16a duplicates the sweep of the track 16b, except that it has a 90° phase lead at all frequencies.

Operation of the apparatus involves the following steps:

(1) A large pulse of current, of brief duration, is passed through the printed track 16a. This impresses a pattern of magnetization on the magnetizable disc 20, such that, on playback from conventional head 17a, a voltage waveform is produced which is related to the track 16a. In fact, the voltage waveform (provided that the current pulse is of suitable magnitude) differs from the waveform of the track only in that the former has a 6 db/octave rise with frequency. This can be equalized by the inclusion of a standard RC integrator in the playback amplifier. Such an integrator also yields a 90° phase lag, which is compensated in advance by the 90° phase lead of the track 16a. The output from the amplifier connected to the head 17a is therefore a linear-frequency sweep of the same waveform as that laid down on the printed track 16b.

(2) This output is recorded on the disc 20 by the head 17d. The function of this head 17d is merely to store the master sweep signal, so that the latter is available for use, singly or repetitively, as an input to the system under test.

(3) For illustrative purposes, the master signal may be played back from the head 17d, through normal equalization, to the head 17b. The waveform recorded on the head 17d is therefore that illustrated in FIGURE 1b. The corresponding output from the printed track 16b after one revolution of the disc 20, is the auto-correlation function of FIGURE 1f.

(4) Again for illustrative purposes, the output from the printed track 16b (after suitable equalization), which may be carried out in the manner described in the above-identified U.S. application Ser. No. 190,912 may be recorded by the head 17c. As the recorded auto-correlation pulse is transported along the printed track 16c, it generates therein a signal which (again after suitable equalization) is very nearly the same as the master sweep repetitively available from the head 17d. In particular, these two sweep signals duplicate each other in amplitude and phase.

(5) If now operation (3) is repeated, but with the system under test connected between the head 17d and the head 17b, the signal recorded on the head 17b will be that depicted in FIGURE 1d. The output from the printed track 16b is the impulse response of FIGURE 1g.

(6) If operation (4) is repeated under these conditions, there will be obtained from the printed track 16c a waveform (depicted in FIGURE 1j) which is very nearly the same as that applied to the head 17b (FIGURE 1d). This in itself is pointless, except when the master test signal constitutes only part of the total input to the system under test; in this case, as has been described above, the provision of gating means at the points $x$ and $y$ in FIGURE 1h allows the derivation of the waveform of FIGURE 1j under conditions where the waveform of FIGURE 1d is not discernible. The gating means, which is shown diagrammatically in FIGURES 5a and 5b where it is identified by the reference numeral 52, may be provided by microswitches (not shown) operated from cams on the shaft 24, or contacts of other type similarly arranged, or electronic gates may be used which are triggered from a pulse or pulses derived by any means from the rotation of the shaft 24.

(7) Any of the waveforms obtained by the apparatus may be displayed on one or more oscilloscopes, or they may be displayed as traces, for example as the traces 32, on sensitive paper which may be mounted on a drum 31 fitted to the shaft 24, using styli which are shown generally at 33 in FIGURE 3a. In the event that oscilloscopes are used, the time bases of these oscilloscopes. may be obtained from a potentiometer (not shown) mounted on the shaft 24 or by a scan generator triggered by a pulse or pulses derived from the rotation of the shaft 24. In this way the generation and display of the wave forms are locked together.

Figure 5A:
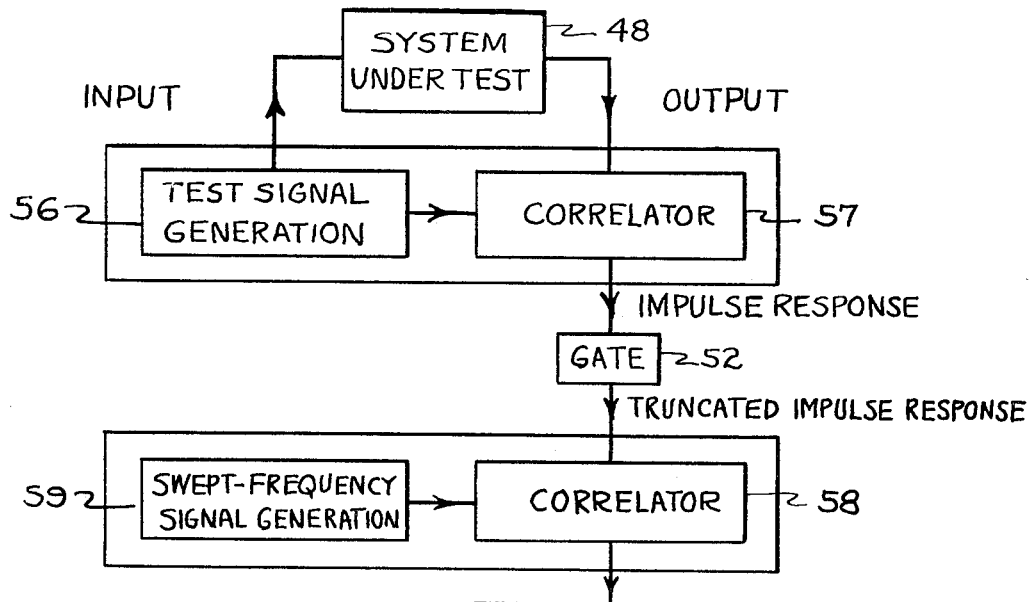
FIGURE 5a shows diagrammatically an apparatus for determining the amplitude-frequency response of a system under test.
Figure 5B:
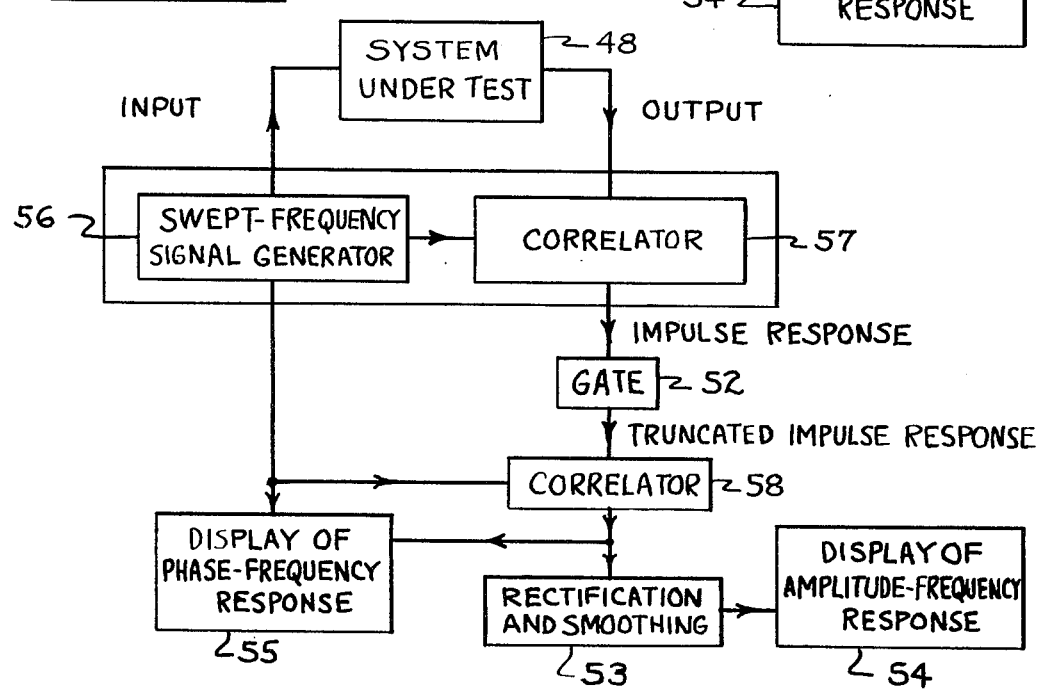
FIGURE 5b shows diagrammatically an apparatus for determining both the amplitude-frequency response and the phase-frequency response of a system under test.

(8) The waveform of FIGURE 1d or 1j may be rectified and smoothed by circuits indicated at 53 in FIGURES 5a and 5b to give the waveform of FIGURE 1e or 1k, and these latter waveforms may be displayed by the styli 33, or by oscilloscopes indicated at 54 in FIGURES 5a and 5b, to yield a plot of the system's amplitude-frequency response.

(9) The waveform of FIGURE 1d or 1j may be phase-compared with the repetitive waveform of FIGURE 1b generated in a suitable manner as indicated by the reference numeral 56 in FIGURE 5b, to yield the system's phase-frequency response; the display may be of Lissajous type if the frequency range is suitable, or the response may be obtained from an electronic phase-comparison circuit and displayed on an oscilloscope indicated at 55 in FIGURE 5b.

In this way the apparatus may be used to obtain a simultaneous display of the amplitude-frequency response, the phase-frequency response, and the impulse-response. By appropriate programming of the signal paths, and by appropriate switching of the erase heads 18, a "running" analysis may be made; thus changes may be made in the system under test, and the effect of those changes on the transfer characteristics of the system may be continuously monitored. Alternatively, other inputs may be added to the system, and the effect of these other inputs on the transfer characteristics may be continuously monitored. The provision of these facilities by a compact and inexpensive apparatus provides a most useful feature of the present invention. It constitutes a desirable improvement in equipment intended for the designing and testing of servo, electroacoustic and electronic systems generally.

The frequency range in which the apparatus of FIGURES 3a and 3b operates may be varied by changes in the rotational speed of the disc 20. The magnitude of these changes is set by head and tape wear at high speeds, and by the normal laws of magnetic induction at low speeds. It should be noted that changes of rotational speed do not affect the time-bandwidth product of the test signal.

In order to maximize the useful time-bandwidth product, it is usual to employ a sweep bandwidth which is not much greater than the significant bandwidth of the system under test. The apparatus may be adapted to any bandwidth merely by the changing of a printed-circuit board; these boards are inexpensive and easily fitted. The master sweep is always derived from the board—in the manner of step (1) above—and thus the apparatus is extremely flexible.

It has been said above that the limit of low-frequency applicability of the apparatus is set by the laws of magnetic induction. One important application of the apparatus is in the determination of the transfer characteristics of systems used in process control (for example, in refineries and in machine-tool programming); these applications involve very low frequencies. This difficulty can be overcome by the provision of a flux-sensitive head in position 17d. Then the master sweep signal is recorded on this track at a conveniently high speed, but the playback of the master sweep into the system under test (and the recording of the system output on head 17b) is performed at a suitably low speed. At the end of one rotation the high speed is resumed, and the other operations are performed normally; the result is a display of the normal type but with a magnification of the frequency scale. It should be noted that the wavelengths on the tape are entirely normal, in this technique, and that the slow-speed recording of the system output therefore constitutes no problem.

For extremely low frequencies or for particular applications it may be desirable to generate the master sweep in some other way. There are many possibilities, one of which is illustrated in FIGURE 4. A disc 40, which may be driven from or mounted on the shaft 24, has its outer edge 41 modulated with the desired swept-frequency signal; this edge 41 operates as a cam to actuate a cam follower 42 which is linked mechanically to a linear potentiometer 43. With a suitable energizing voltage maintained by a source 44 across the potentiometer 43, a reproducible swept-frequency signal is derived from the potentiometer wiper and appears across the leads 45.

Photoelectric or reluctance ("tone-wheel") systems of generation may also be used, in place of the disc 40. In FIGURES 5a and 5b the apparatus for generating or developing the test signal is identified by the reference numeral 56.

The manner of injection of the master test signal into the system under test depends on the nature of the system. Thus the master sweep may be injected as an electrical signal, or it may be transduced into an acoustic signal, or it may be used to modulate the fluid flow through a valve, or it may be used to modulate the supply of heat to a distillation column or other part of the system.

The signal from the leads 45 may, in suitable cases, be fed as a test signal direct into the system to be tested, for example in the case of an acoustical system including an audio amplifier. Alternatively it may be used to produce an input or a control for an industrial or other system which may or may not be wholly or mainly electrical. For example, the leads 45 may be connected to a servo-control unit 46 which applies the desired control to a unit 47 in the system under study, which system is indicated generally by the reference 48. The control unit 46 may, for example, be arranged to modulate the volume flow through the system 48 or the heat supply to it, to give two examples.

The reference 49 indicates a later stage of the system 48 at the end of the system or of the section of the latter which is being tested. From this unit an output representing the factor being monitored, which may, for example, be temperature or rate of flow, is supplied to a control unit 50. This provides a corresponding voltage output which is applied to a recording head. This head is indicated at 51 in FIGURE 4, where it is shown recording on a magnetic medium 52. The head 51 may, however, be the head 17b of FIGURE 3b where it records on the disc 20. The result of the analysis will then be obtained and displayed in the manner which has been described.

The present invention is not, however, limited to the use of such disc-type apparatus, but correlators of other types such as have been described in the aforesaid patent applications may be used and, hence, such correlators have been identified by the reference numerals 57 and 58 in FIGURES 5a and 5b.

The disc-type apparatus herein described, however, offers a number of advantages and it is preferred. In particular it provides for cyclic generation of the master sweep and the resulting simplicity which is possible for the phase-frequency display.

The disc-type apparatus herein described has facility for mounting more than four sets of record-replay and erase heads. These additional heads may be used to provide "stacking" (sometimes called "integration") of the output signals obtained from a plurality of injections of the master sweep. Thus, different heads may be used for the recording of these several output signals, and these heads may be combined for the subsequent playback. This facility is useful when the test signal must be only a very small part of the total system input, and the time-bandwidth product provided by the apparatus is inadequate to provide an impulse response which is clearly visible above the correlation background.

Alternatively, the space which remains unused when the disc-type apparatus is used with the present preferred technique may be employed to duplicate the present facilities; in this way the responses of a plurality of systems may be displayed continuously.

A linear-frequency constant-amplitude sweep is not the only signal which may be used with this apparatus. If the system under test is known to have a response which falls with frequency, for example, a linear sweep may be used whose amplitude rises with frequency; alternatively, a constant-amplitude non-linear sweep whose sweep rate decreases with frequency may be used. Non-linear sweeps are appropriate also when a non-linear scaling of the frequency axis is desired; suitable equalization must be provided in this case. The waveforms on the tracks 16a and 16b do not require to be sweeps, but they may take one of the alternative forms discussed in the introductory part of this specification.

Phase distortion in any of the amplifying or recording equipment associated with the apparatus may be eliminated by anticipating it in the manufacture of the printed tracks 16; these techniques are discussed in U.S. application Ser. No. 190,912 and others.

The amplifying equipment used in carrying out the present invention may be constructed according to principles well known in the art; it may include a logarithmic amplifier for display of the amplitude-frequency response. The recording and erase heads 17 and 18 (and also the head 51 of FIGURE 4) may also be conventional, except that (since the wavelengths employed are defined by printed-circuit technique) their gaps may be considerably wider than is usual.

While the present invention has been described in connection with the details of particular embodiments thereof, it should be understood that these details are not intended to be limitative of the invention since many modifications will be readily apparent to those skilled in this art and it is, therefore, contemplated in the accompanying claims to cover any such modifications as fall within the true spirit and scope of the invention.

What is claimed as new and desired to be secured by Letters Patent of the United States is:

1. Apparatus for determining the phase frequency response transfer characteristic of a system, said apparatus comprising means for generating a swept frequency test signal, means for injecting said signal into said system, means for obtaining from said system an output representative of said signal after transfer through at least part of said system, means for correlating said output with said signal to produce a correlation signal, means for developing an additional swept frequency signal, means for correlating said correlation signal with said additional swept frequency signal to develop a correlation output, and means for comparing the phase of said correlation output with the test signal to obtain the phase-frequency response of the system.

2. Apparatus according to claim 1 wherein said test signal generating means includes a magnetic head having a conducting trace corresponding to the waveform of the test signal, a magnetic record medium arranged adjacent said trace, and means for passing an electrical pulse along said trace to induce said test signal in said record medium, said signal injecting means including structure for developing said test signal from said record medium.

3. A method of determining the amplitude-frequency response of a system which method comprises generating a test signal of a selected frequency band width, injecting said test signal into the system, obtaining from the system an output which includes the test signal after transfer through the system, correlating said output against at least a portion of said test signal to obtain a resultant waveform a part of which represents the impulse response of the system and other portions of which represent background, selecting said part only of the resultant waveform, producing a swept frequency signal, and correlating the selected part of said waveform against said swept frequency signal to obtain the amplitude-frequency response of the system.

4. A method according to claim 3 wherein the test signal is also a swept frequency and wherein the result of the final correlation is subjected to a rectifying and smoothing step and wherein the phase-frequency response of the system is obtained by phase comparison of the result of the final correlation with said test signal.

5. Apparatus for determining the amplitude-frequency response of a system including means for passing first signals therethrough, said apparatus comprising means for generating a test signal or selected frequency band width which is passed through the system in the presence of said first signals, means for deriving from the system an output which includes the test signal after transfer through the system, means for correlating said output against the test signal to produce a waveform, means for selecting only a portion of said waveform approximating the impulse response characteristic of said system as distinguished from any random noise or other background present in said waveform, means for developing a swept frequency signal, and additional means for correlating the selected portion of said waveform against said swept frequency signal to determine the amplitude-frequency response of the system.

6. Apparatus according to claim 5 wherein the test signal generating means includes structure for producing a swept frequency signal which is a replica of the first mentioned swept frequency signal.

7. The apparatus defined by claim 5 wherein said test signal is also a swept frequency signal and wherein said additional means includes means for rectifying and smoothing the result of the final correlation performed by said additional means and means for comparing the phase of the test signal with the result of the final correlation performed by said additional means to obtain the phase-frequency response of the system.

8. The apparatus defined by claim 6 wherein said additional means includes means for rectifying and smoothing the result of the final correlation performed by said additional means and means for comparing the phase of the test signal with the result of the final correlation performed by said additional means to obtain the phase-frequency response of the system.

9. A method for analyzing a signal, said method comprising the steps of generating a signal and a first wave, correlating said signal against said first wave to produce a waveform, selecting only a portion of said waveform representing the correlation function between said signal and said first wave as distinguished from background noise on said waveform, producing a swept frequency wave, and correlating said selected waveform portion against said swept frequency wave.

10. A method according to claim 9 wherein the first wave is a swept frequency signal which is a replica of the first mentioned swept frequency wave.

11. A method according to claim 9 which further includes the step of rectifying and smoothing the result of the final correlation.

12. The apparatus defined by claim 5 wherein said test signal generating means includes a magnetic head having a conducting trace corresponding to the waveform of the test signal, a magnetic record medium adjacent said trace, and means for passing an electrical pulse along said trace to induce said test signal in said record medium, the means for generating the test signal including structure for developing the test signal from the record medium.

References Cited
UNITED STATES PATENTS

| | | | |
|---|---|---|---|
| 2,595,263 | 5/1952 | Ingalls | 324—57 XR |
| 2,799,734 | 7/1957 | Camp. | |
| 3,174,142 | 3/1965 | Mallinckrodt | 340—174.1 |

RUDOLPH V. ROLINEC, *Primary Examiner.*

E. E. KUBASIEWICZ, *Assistant Examiner.*